United States Patent
Iwasaki et al.

(10) Patent No.: US 10,309,559 B2
(45) Date of Patent: Jun. 4, 2019

(54) DUCT AND METHOD FOR MANUFACTURING SAME

(71) Applicant: KYORAKU CO., LTD., Kyoto (JP)

(72) Inventors: Kenji Iwasaki, Aichi (JP); Teruo Tamada, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 209 days.

(21) Appl. No.: 14/782,868

(22) PCT Filed: Apr. 7, 2014

(86) PCT No.: PCT/JP2014/060109
§ 371 (c)(1),
(2) Date: Dec. 14, 2015

(87) PCT Pub. No.: WO2014/168120
PCT Pub. Date: Oct. 16, 2014

(65) Prior Publication Data
US 2016/0102786 A1    Apr. 14, 2016

(30) Foreign Application Priority Data

Apr. 8, 2013 (JP) ................... 2013-080471
Jul. 30, 2013 (JP) ................... 2013-157531
(Continued)

(51) Int. Cl.
*F16L 9/21* (2006.01)
*B60H 1/00* (2006.01)
(Continued)

(52) U.S. Cl.
CPC .............. *F16L 9/21* (2013.01); *B29C 51/105* (2013.01); *B29C 51/12* (2013.01);
(Continued)

(58) Field of Classification Search
CPC .......................... B29C 51/105; B29C 51/267
See application file for complete search history.

(56) References Cited

U.S. PATENT DOCUMENTS

| | | | |
|---|---|---|---|
| 2007/0006986 | A1 | 1/2007 | Derleth et al. |
| 2010/0071797 | A1 | 3/2010 | Jungers |
| 2014/0130933 | A1 | 5/2014 | Tani et al. |

FOREIGN PATENT DOCUMENTS

| | | |
|---|---|---|
| CN | 2472026 Y | 1/2002 |
| EP | 0338908 A1 | 10/1989 |

(Continued)

OTHER PUBLICATIONS

Near Surface Composition profiles and the adhesive properties of statistical . . . by Alexander Diethert et al, 2010.*
(Continued)

*Primary Examiner* — Matthew J Daniels
*Assistant Examiner* — Kimberly A. Stewart
(74) *Attorney, Agent, or Firm* — Maier & Maier, PLLC

(57) ABSTRACT

Provided is a duct that does not cause defective molding and has a highly sound absorption inner surface which can effectively suppress noise. A duct includes a tubular duct main body and a sound absorption member disposed on the inner surface of the duct main body. The duct has at least one of configurations (1) to (3): (1) the duct main body has a sandwiching part having a pair of opposite wall surfaces, and a side edge of the sound absorption member is sandwiched between the wall surfaces of the sandwiching part; (2) the sound absorption member is pasted to the inner surface of the duct main body with a resin film therebetween; and (3) the sound absorption member and duct main body have parts which are not fused to each other.

4 Claims, 14 Drawing Sheets

(30) Foreign Application Priority Data

Jan. 21, 2014 (JP) ................................ 2014-008710
Mar. 28, 2014 (JP) ................................ 2014-069318

(51) Int. Cl.

| | |
|---|---|
| *F24F 13/02* | (2006.01) |
| *B29C 51/10* | (2006.01) |
| *B29C 51/12* | (2006.01) |
| *B60R 16/08* | (2006.01) |
| *F16L 9/00* | (2006.01) |
| *F24F 13/24* | (2006.01) |
| *B60L 58/26* | (2019.01) |
| *B29K 23/00* | (2006.01) |
| *B29K 105/00* | (2006.01) |
| *B29L 31/30* | (2006.01) |

(52) U.S. Cl.

CPC .......... *B60H 1/00564* (2013.01); *B60L 58/26* (2019.02); *B60R 16/08* (2013.01); *F16L 9/003* (2013.01); *F24F 13/0245* (2013.01); *F24F 13/24* (2013.01); *B29K 2023/12* (2013.01); *B29K 2105/256* (2013.01); *B29K 2995/0002* (2013.01); *B29L 2031/3032* (2013.01); *B60H 2001/006* (2013.01); *F24F 2013/242* (2013.01)

(56) References Cited

FOREIGN PATENT DOCUMENTS

| | | |
|---|---|---|
| EP | 1504933 A1 | 2/2005 |
| JP | 57-46010 A | 3/1982 |
| JP | 60-188618 A | 9/1985 |
| JP | 06-219144 A | 8/1994 |
| JP | 06-272948 A | 9/1994 |
| JP | H11-94341 A | 4/1999 |
| JP | 2000-171085 A | 6/2000 |
| JP | 2001-180250 A | 7/2001 |
| JP | 2001-213136 * | 8/2001 ............ B60H 1/00 |
| JP | 2001-213136 A | 8/2001 |
| JP | 2003-042389 A | 2/2003 |
| JP | 2003-104045 A | 4/2003 |
| JP | 2003-306025 A | 10/2003 |
| JP | 2006-248344 A | 9/2006 |
| JP | 2007-38420 A | 2/2007 |
| JP | 2009-269219 * | 11/2009 ............ B29C 49/20 |
| JP | 2009-269219 A | 11/2009 |
| JP | 2010-145003 A | 7/2010 |
| JP | 2013-010263 A | 1/2013 |

OTHER PUBLICATIONS

Japanese Office Action dated May 1, 2018, in connection with JP Application No. 2014-069318 (6 pgs., including English translation).

Japanese Office Action dated Oct. 3, 2017, in connection with counterpart JP Application No. 2014-069318 (8 pgs., including English translation).

Extended European Search Report dated Apr. 5, 2016, in connection with corresponding EP Application No. 14782588.9 (8 pgs.).

International Search Report dated Jul. 15, 2014 from corresponding International Patent Application No. PCT/JP2014/060109; 4 pgs.

* cited by examiner

FIG. 2
(a)
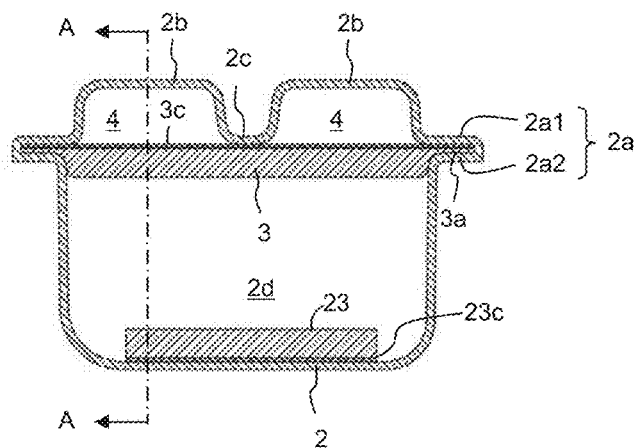
(b) A-A SECTIONAL VIEW
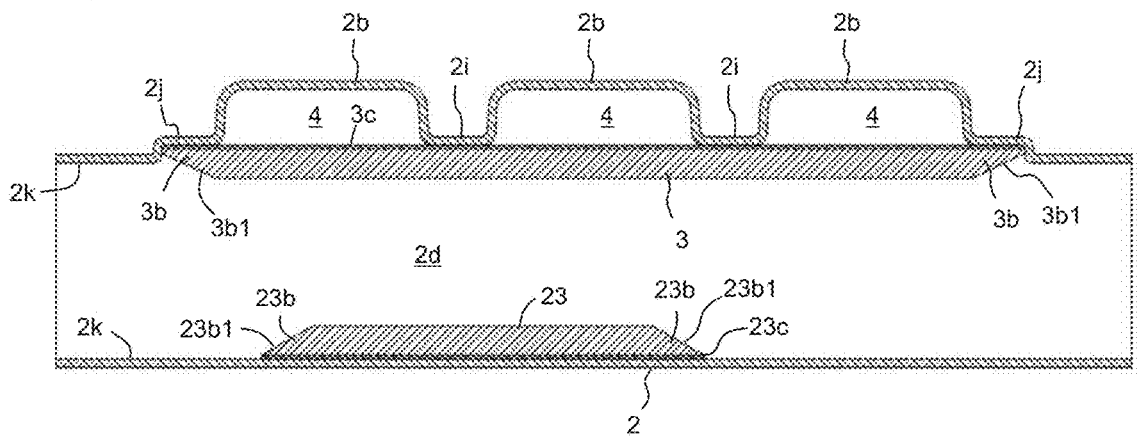

FIG. 7
(a)
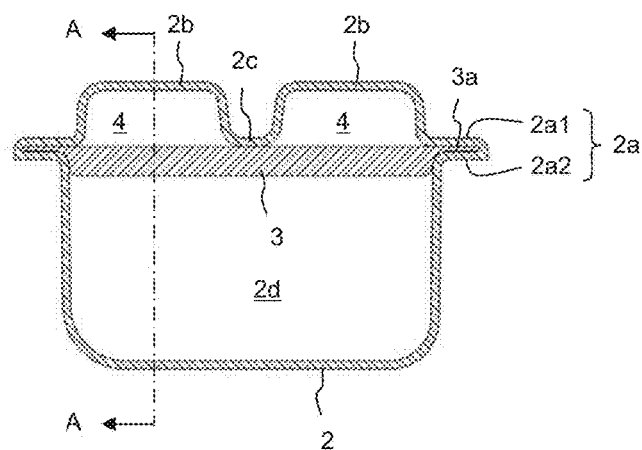
(b) A-A SECTIONAL VIEW
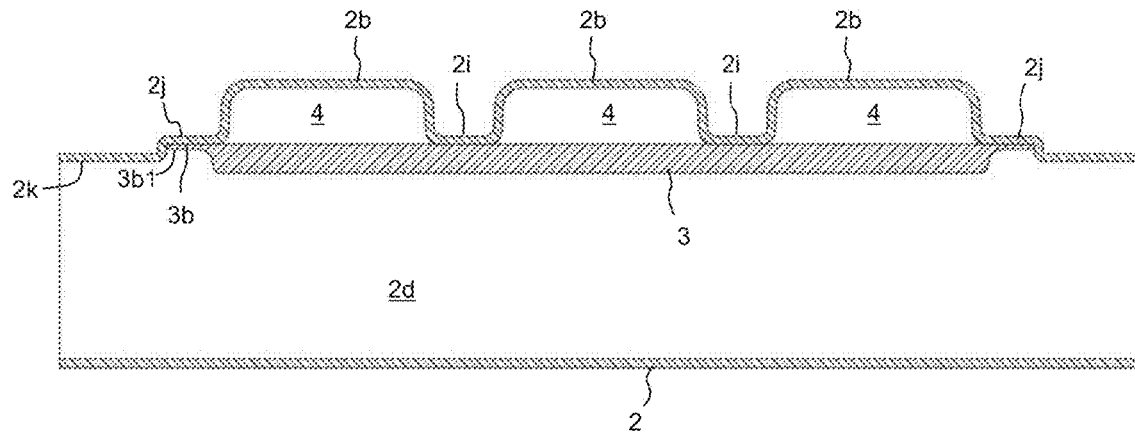

(a)          (b)

DUCT AND METHOD FOR MANUFACTURING SAME

TECHNICAL FIELD

The present invention relates to a duct and method for manufacturing same.

BACKGROUND ART

For example, a vehicle having a battery mounted thereon uses an air intake duct to ventilate or cool the space containing the battery. A sound emitted by a suction apparatus adjacent to one opening of the air intake duct may leak as noise from an opposite opening through the duct. For this reason, air intake ducts for batteries are often required to have sound absorption properties. For example, foam ducts, which are formed of foam resins, are being used as such air intake ducts.

However, the fact is that foam ducts do not necessarily have sufficient sound absorption properties and have yet to produce effects that prevent noise. For this reason, the development of a sound absorption duct that can produce higher sound absorption properties is being waited for.

In the field of air-conditioning ducts, there have been known air-conditioning ducts including a foam resin layer for improving heat insulation properties and preventing condensation or the like. For example, Patent Literature 1 discloses a duct in which the outer peripheral surface of a duct main body serving as a gas passage is coated with a coating layer wall. In this duct, the coating layer wall is formed of a heat-shrinkable foam resin sheet, and the outer peripheral surface of the duct main body is coated with a heat-shrunk heat-shrinkable foam resin sheet.

Patent Literature 2 discloses an air-conditioning flexible duct that is connected to air-conditioning apparatuses, such as an air-conditioning chamber, an air-conditioning elbow, an air outlet, and a ventilation opening, and has a ventilation passage through which a wind circulates. In this air-conditioning flexible duct, a heat insulation material is fixed to the outer surface of a duct main body in the attachment use state thereof, and a heat-shrinkable film is closely pasted to the outer surface of the heat insulation material.

For the ducts disclosed in Patent Literatures 1 and 2, the foam resin sheet or heat insulation material pasted to the outer surface of the duct is believed to have sound absorption properties. Accordingly, these ducts are expected to have a certain level of sound absorption properties.

Patent Literatures 3 and 4 disclose ducts in which a foam sheet or foam is pasted to the inner surface. Specifically, Patent Literature 3 discloses an air guide duct which is disposed in a vehicle interior member, communicatively connects the air outlet of the vehicle interior member and the air feeding opening of an air-conditioning unit mounted on the vehicle, and guides a conditioned air from the air-conditioning unit to the air outlet. This air guide duct is provided with a shape required for a duct and is composed of an outer layer sheet having stiffness which allows the duct to hold the shape and an inner layer sheet which is pasted to the entire inner surface of the outer layer sheet and which performs sound absorption and heat insulation functions.

Patent Literature 4 discloses an automobile duct which is a multilayer body having an elastic foam on one side thereof. This automobile duct is formed by folding a multilayer body that has a hinge approximately in the center and flanges on both sides and has a desired recessed shape, at the hinge with the elastic foam inside and then fixing the flanges in an oppositely contacting manner.

In the ducts disclosed in Patent Literatures 3 and 4, the foam or the like is pasted to the inner surface. Further, Patent Literature 3 mentions sound absorption.

CITATION LIST

Patent Literature

[Patent Literature 1] Japanese Unexamined Patent Application Publication No. 2003-42389
[Patent Literature 2] Japanese Unexamined Patent Application Publication No. 6-272948
[Patent Literature 3] Japanese Unexamined Patent Application Publication No. 2001-180250
[Patent Literature 4] Japanese Unexamined Utility Model Registration Application Publication No. 60-188618

SUMMARY OF INVENTION

Technical Problem

However, in Patent Literatures 3 and 4, the sound absorption member and resin sheet are first integrated with each other and then molded using a mold. Accordingly, these technologies have a problem in foldability. Specifically, when the integrated sound absorption member and resin sheet are molded using a mold, the resin sheet is difficult to mold due to the difficulty of the expansion thereof. Thus, defective molding is more likely to occur.

Further, molded ducts have yet to obtain sufficiently high sound absorption properties in practice. For example, even when a foam resin sheet, heat insulation sheet, or the like is pasted to the outer surface of the duct as disclosed in Patent Literature 1 or 2, the duct does not produce sufficient sound absorption effects. On the other hand, when a foam or the like is pasted to the inner surface of the duct as disclosed in Patent Literature 3 or 4, the sound absorption properties are increased compared to when the foam or the like is pasted to the outer surface of the duct. Nevertheless, satisfactorily high sound absorption properties as those of an air inlet duct for batteries have yet to be obtained.

The present invention has been proposed in view of the foregoing, and an object thereof is to provide a duct that does not cause defective molding and has a highly sound absorption inner surface that can effectively suppress noise, and a method for manufacturing the same.

Solution to Problem

The present invention provides a duct including a tubular duct main body and a sound absorption member disposed on an inner surface of the duct main body. The duct has at least one of configurations (1) to (3): (1) the duct main body has a sandwiching part having a pair of opposite wall surfaces, and a side edge of the sound absorption member is sandwiched between the wall surfaces of the sandwiching part; (2) the sound absorption member is pasted to the inner surface of the duct main body with a resin film therebetween; and (3) the sound absorption member and duct main body have parts which are not fused to each other.

To accomplish the above object, the present inventors conducted various types of research. As a result, the inventors found that when a resin sheet was first molded and then a sound absorption member was pasted, defective molding was less likely to occur and that higher sound absorption effects were produced by pasting the sound absorption member to the inner surface of the duct main body than by boding it to the outer surface of the duct main body. On the basis of these findings, the inventors achieved a duct that does not cause defective molding and has a highly sound absorption inner surface that can effectively suppress noise.

Further, the present invention is characterized in that it has at least one of configurations (1) to (3):

(1) the duct main body has a sandwiching part having a pair of opposite wall surfaces, and a side edge of the sound absorption member is sandwiched between the wall surfaces of the sandwiching part;

(2) the sound absorption member is pasted to the inner surface of the duct main body with a resin film therebetween; and (3) the sound absorption member and duct main body have parts which are not fused to each other.

Depending on the material of the sound absorption member, it may not be pasted to the inner surface of the duct main body with sufficiently high strength, and available materials for sound absorption members may be limited. For example, when the resins of which the duct main body and sound absorption member are formed are both polypropylene, the sound absorption member is firmly pasted to the duct main body. When the resin of which the duct main body is formed is polypropylene and the resin of which the sound absorption member is formed is polyurethane or PET, the sound absorption member is not sufficiently firmly pasted to the duct main body and may be peeled easily.

When the present invention has the configuration (1), the sound absorption member disposed on the inner surface of the duct main body can be prevented from being separated from the duct main body. When the present invention has the configuration (2), the sound absorption member can be firmly pasted to the duct main body by selecting a suitable resin film.

When the present invention has the configuration (3), the duct has a highly sound absorption inner surface that can effectively prevent noise.

Various embodiments of the present invention are described below. The embodiments below can be combined with each other.

Preferably, the duct has the configuration (1). Preferably, the duct main body includes sandwiching parts each having a pair of opposite wall surfaces on both sides in a width direction, of the duct main body, and the side edges disposed on both sides of the sound absorption member are sandwiched between the wall surfaces of the corresponding sandwiching part. Preferably, a hollow is formed between the duct main body and the sound absorption member. Preferably, the duct main body has an outward protrusion in a surface having the sound absorption member thereon, the outward protrusion protruding out of the duct main body, and the hollow is formed between the outward protrusion and the sound absorption member. Preferably, the outward protrusion is provided with a rib protruding into the duct main body, and the sound absorption member is in contact with the rib and thus deformation of the sound absorption member due to an internal pressure of the duct main body is suppressed. Preferably, the duct has the configuration (2). Preferably, the resin film has a melting point equal to or lower than a melting point of the duct main body. Preferably, a surface adjacent to a passage, of at least one edge of the sound absorption member in a length direction of the duct main body is inclined with respect to the inner surface of the duct main body. Preferably, the duct has the configuration (3). Preferably, an air layer is formed between the sound absorption member and the duct main body. Preferably, a recess and a projection are formed in the duct main body so that the air layer is formed. Preferably, a recess and a projection are formed in the sound absorption member so that the air layer is formed. Preferably, an area opposite to the sound absorption member, of the duct main body is partially cut off.

Another aspect of the present invention provides a method for manufacturing a duct including a step of causing molds to suck and form a pair of molten resin sheets to be formed into a tubular duct main body, then disposing a sound absorption member on the resin sheets, and closing the molds. The method has at least one of configurations (A) to (C): (A) the molds sandwich a side edge of the sound absorption member between the resin sheets; (B) the sound absorption member is disposed on the resin sheets with a resin film therebetween; and (C) the sound absorption member is pasted to the resin sheets. Preferably, the method has the configuration (A). Preferably, the side edge of the sound absorption member is compressed by the pair of resin sheets when the molds are closed.

Preferably, the method has the configuration (B). Preferably, prior to disposing the sound absorption member on the resin sheets, the resin film is fixed to the sound absorption member. Preferably, the resin film is formed of a material having a melting point equal to or lower than a melting point of the resin sheets. Preferably, the method has the configuration (C). Preferably, a recess and a projection are previously formed in the molds so that when the sound absorption member is attached, the sound absorption member and the duct main body have parts which are not fused to each other. Preferably, the mold is provided with a recess and a projection so that the sound absorption member is pasted to the duct main body in a way that the sound absorption member and the duct main body have parts which are not fused to each other. Preferably, after taking out the duct from the mold, the resin sheet corresponding to the parts in which the sound absorption member and the duct main body are not fused to each other is partially cut off.

BRIEF DESCRIPTION OF THE DRAWINGS

FIG. 2(a) is a cross-sectional view of the sound absorption duct shown in FIG. 1, and FIG. 2(b) is a sectional view taken along line A-A in FIG. 2(a).

FIG. 3 includes diagrams showing an example of steps of manufacturing the sound absorption duct shown in FIG. 1, in which FIG. 3(a) shows a step of causing resin sheets 13 and 14 to contact tightly to molds 11 and 12, and FIG. 3(b) shows a step of pasting a sound absorption member 3 to a molten resin sheet 14.

FIG. 7(a) is a cross-sectional view of the sound absorption duct shown in FIG. 6, and FIG. 7(b) is a sectional view taken along line A-A in FIG. 7(a).

FIG. 8 includes diagrams shows an example of steps of manufacturing the sound absorption duct shown in FIG. 6, in which FIG. 8(a) shows a step of causing resin sheets 13 and 14 to contact tightly to molds 11 and 12, and FIG. 8(b) shows a step of pasting a sound absorption member 3 to a molten resin sheet 14.

FIG. 12 includes diagrams showing an example of steps of manufacturing the sound absorption duct of the third embodiment, in which FIG. 12(a) shows a step of inserting sound absorption members and FIG. 12(b) shows the state in which the sound absorption members are attached.

FIG. 14 includes diagrams showing an example of steps of manufacturing the sound absorption duct of the fourth embodiment, in which FIG. 14(a) shows a step of inserting sound absorption members and FIG. 14(b) shows the state in which the sound absorption members are attached.

FIG. 16 includes diagrams showing an example of steps of manufacturing the sound absorption duct of the fifth embodiment, in which FIG. 16(a) shows a molding step and FIG. 16(b) shows a cutting step.

DESCRIPTION OF EMBODIMENTS

Now, embodiments of a duct and manufacturing method the same according to the present invention will be described in detail with reference to the drawings. Various features described in the embodiments below can be combined with each other. Inventions are established for the respective features.

First Embodiment

A first embodiment of the present invention will be described below. The present embodiment includes the configurations (1) to (3) and configurations (A) to (C) described above.

Figure 1:
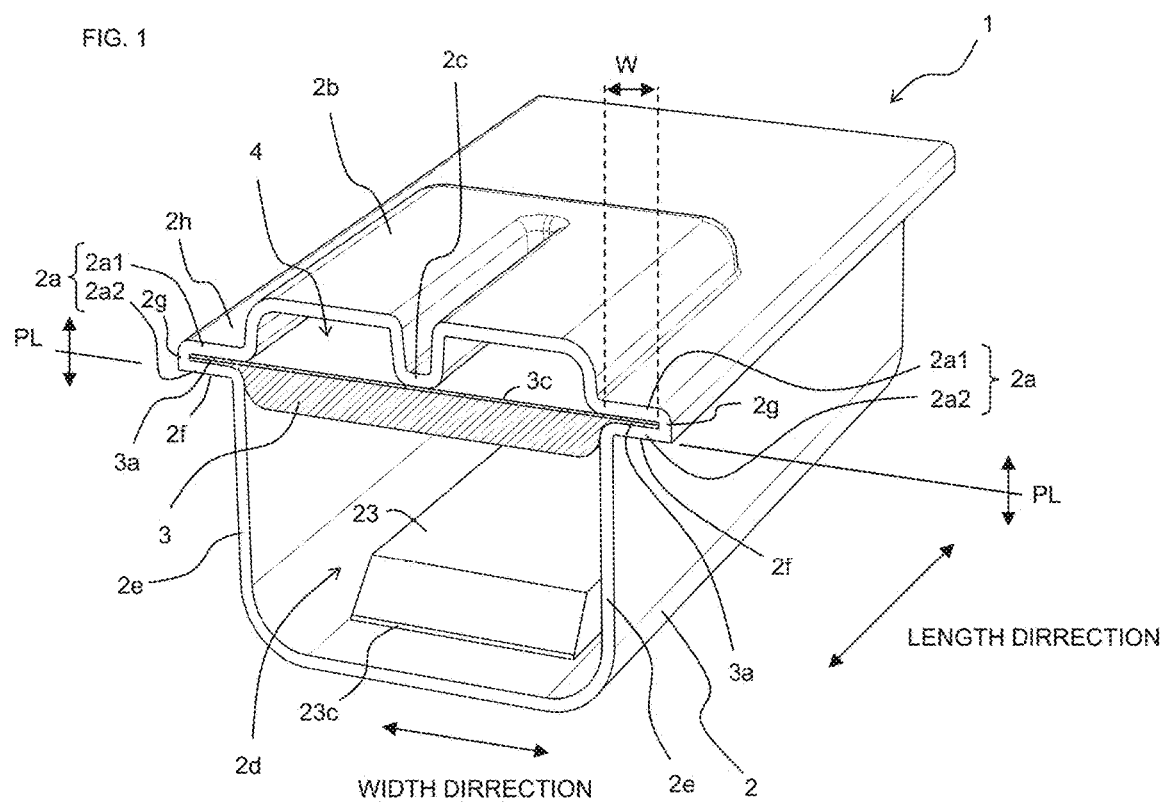
FIG. 1 is a schematic perspective view of a sound absorption duct of a first embodiment of the present invention.

As shown in FIG. 1, a duct (sound absorption duct) 1 of the present embodiment includes a tubular duct main body 2 having a passage 2d for a gas (e.g., air) and sound absorption members 3 and 23 disposed on the inner surface of the duct main body 2. The sound absorption members 3 and 23 are pasted to the inner surface of the duct main body 2 with resin films 3c and 23c, respectively, therebetween.

The duct main body 2 includes a sandwiching part 2a having a pair of opposite wall surfaces 2a1 and 2a2. The sandwiching part 2a is disposed so as to protrude from a side wall 2e of a part forming the passage 2d outward in the width direction. The side edge 3a of the sound absorption member 3 are sandwiched between the side walls 2a1 and 2a2 of the sandwiching part 2a in such a manner that the side walls 2a1 and 2a2 contact tightly to the side edge 3a of the sound absorption member 3. While the side edge 3a need not necessarily be compressed by the side walls 2a1 and 2a2, it is preferably compressed by the side walls 2a1 and 2a2 in order to improve the adhesion. The compressibility (yet-to-be-compressed thickness/compressed thickness) of the side edge 3a is, for example, 2 to 30, preferably 10 to 20. Too low compressibility is not preferable, since the side edge 3a is more likely to come out. Nor is too high compressibility preferable. This is because during molding, resins sandwiching both sides of the sound absorption member easily move into the duct; the sound absorption member also easily moves into the duct as the resins move; and thus the sound absorption member disposed in the duct passage becomes wrinkled easily.

The thickness (the distance between an upper surface 2h and a lower surface 2f) of the sandwiching part 2a may be any size, but it is preferably 1.5 to 6.0 mm. Too small a thickness is not preferable, since the stiffness of a flange would decrease easily and thus the stiffness of the duct would also decrease easily. Nor is too large a thickness preferable, since the sandwiching part 2a would easily interfere with other members. Preferably, the thickness of the sandwiching part 2a is, for example, twice or more the average thickness of the duct main body. A thickness which is less than twice the average thickness of the duct main body is not preferable. This is because during molding, resin sheets sandwiching both sides of the sound absorption member easily move into the duct; and the sound absorption member also easily moves into the duct as the resins move; and thus the sound absorption member disposed in the duct passage becomes easily wrinkled. The width W of the side edge 3a may be any size, but it is preferably 3 to 10 mm. When the width is too small, the sound absorption member 3 would easily come out of the sandwiching part 2a; when the width is too large, the amount of protrusion of the sandwiching part 2a would be excessively increased.

In the present embodiment, the sound absorption member 3 is approximately rectangular and has two side edges 3a which are approximately parallel with each other. The duct main body 2 has pairs of opposite wall surfaces 2a1 and 2a2 on both sides thereof in the width direction, and each side edge 3a of the sound absorption member 3 are sandwiched between the wall surfaces 2a1 and 2a2 of the corresponding sandwiching part 2a. The wall surfaces 2a1 and 2a2 forming each pair are connected together at an edge 2g in the width direction, thereby preventing the leakage of a gas from the duct main body 2.

The duct main body 2 is formed, for example, by shaping molten resin sheets using molds. The resin sheets may be a non-foam resin sheets or foam resin sheets. Non-foam resin sheets are molded into a solid duct; foam resin sheets are molded into a foam duct.

The sound absorption members 3 and 23 are, for example, nonwoven fabrics or resin foams and are preferably formed of materials passing air. When the sound absorption members 3 and 23 are resin foams, the foams are preferably open celled. The sound absorption members 3 and 23 may be members obtained by forming small holes in members which do not pass air (resin sheets or the like). Members which do not pass air may be disposed as the sound absorption members 3 and 23 in such a manner that spaces are made between the members and the inner surface of the duct main body 2. Glass wool, polyethylene fibers, polypropylene fibers, polyurethane foams, polyethylene foams, and the like are available as the sound absorption members 3 and 23.

Figure 3:
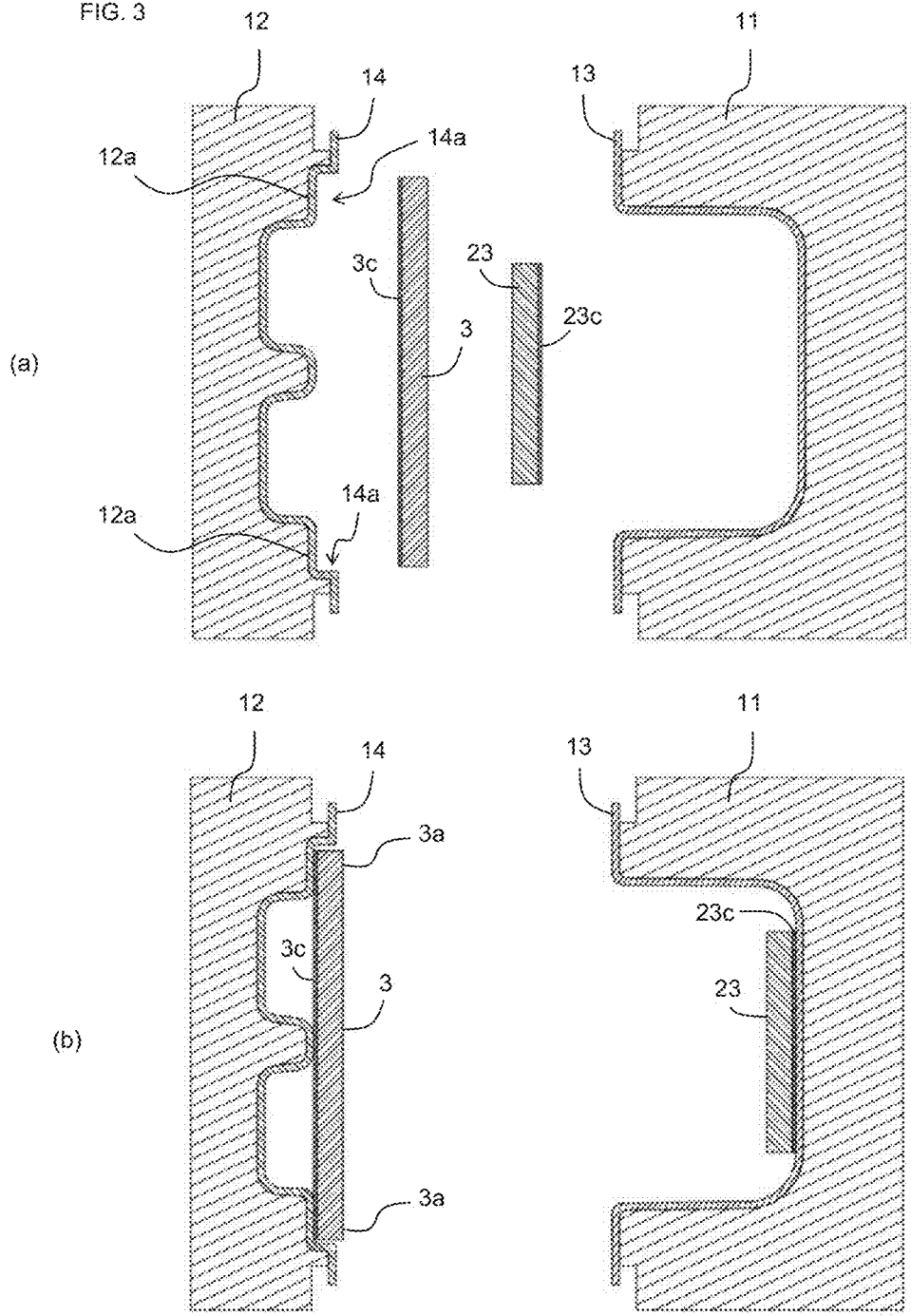
Figure 4:
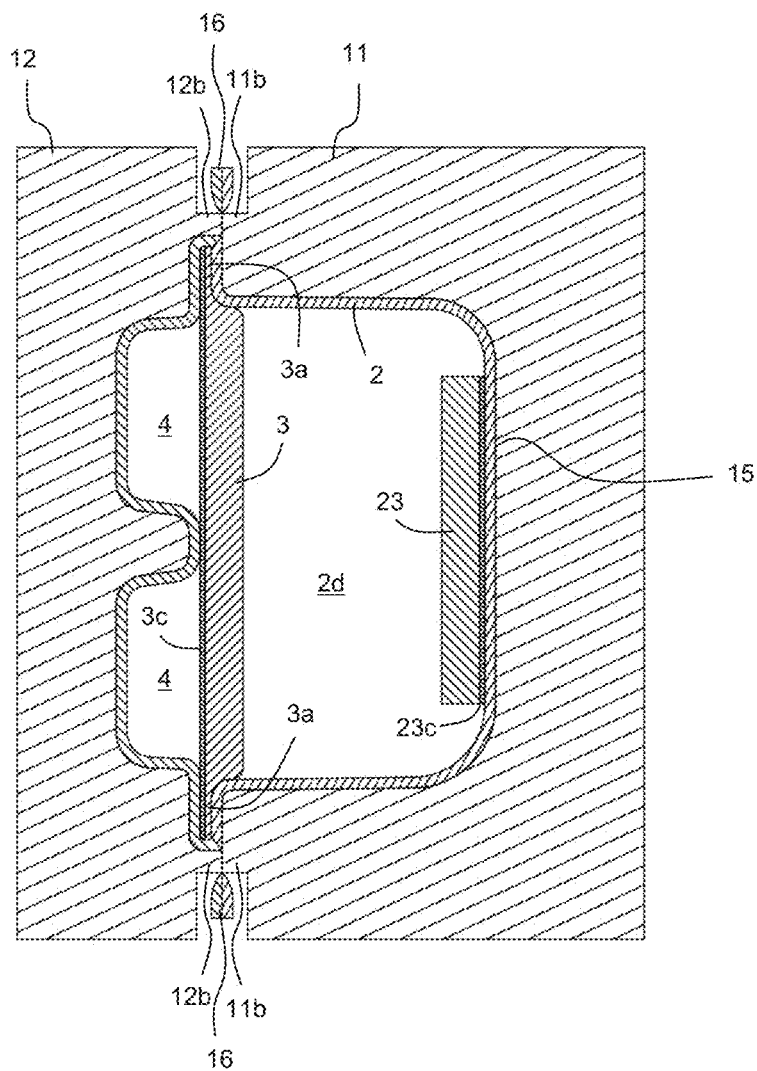
FIG. 4 is a diagram showing an example of a step of manufacturing the sound absorption duct following FIG. 3 and shows the state after the molds are closed.

The duct main body 2 and sound absorption members 3 and 23 may be formed of the same material or different materials. When the sound absorption members 3 and 23 are directly pasted to the inner surface of the duct main body 2, the sound absorption members 3 and 23 are preferably attached with highest possible adhesion to prevent the peel-off of the sound absorption members 3 and 23 from the duct main body 2. In the present embodiment, the sound absorption members 3 and 23 are attached to the inner surface of the duct main body 2 with the resin films 3c and 23c therebetween. Thus, even when the sound absorption members 3 and 23 are formed of materials which are difficult to paste to the duct main body 2, the sound absorption members 3 and 23 can be firmly pasted to the inner surface of the duct main body 2 by selecting suitable resin films 3c and 23c. For example, when the duct main body 2 is formed of polypropylene and the sound absorption members 3 and 23 are formed of polyurethane foams, the sound absorption members 3 and 23 are difficult to paste directly to the inner surface of the duct main body 2. However, by disposing the resin films 3c and 23c formed of a material easily adherable to the duct main body 2 between the sound absorption members 3 and 23 and duct main body 2, the sound absorption members 3 and 23 can be firmly pasted to the inner surface of the duct main body 2. The resin films 3c and 23c are preferably films having a melting point equal to or lower than that of the duct main body 2. Specifically, the resin films 3c and 23c are preferably formed of a polyolefin such as polypropylene or polyethylene (LDPE, LLDPE). This is because, as shown in FIGS. 3 and 4, heat from a pair of molten resin sheets 13 and 14 to be formed into the duct main body 2 melts the resin films 3c and 23c to allow the resin films 3c and 23c to be easily pasted to the resin sheets 13 and 14.

The resin films 3c and 23c may be fixed to the sound absorption members 3 and 23 by any means, including welding and bonding.

For the sound absorption member 3, at least one side edge 3a thereof is sandwiched between the side walls 2a1 and 2a2 of the corresponding sandwiching part 2a of the duct main body 2. Accordingly, even when the resin film 3c is omitted, the sound absorption member 3 can be fixed to the duct main body 2. However, when the sound absorption member 3 is not pasted to the duct main body 2, the sound absorption member 3 is held by the duct main body 2 only at the side edge 3a. Accordingly, when a gas flows through the duct main body 2, the sound absorption member 3 is more likely to vibrate. On the other hand, when the resin film 3c is disposed between the sound absorption member 3 and duct main body 2, the sound absorption member 3 is fixed to the duct main body 2 at edges 3b of the sound absorption member 3 in the length direction and the contact surfaces between the sound absorption member 3 and ribs 2c and 2i. Thus, when a gas flows through the duct main body 2, the vibration of the sound absorption member 3 is suppressed.

While the resin films 3c and 23c are disposed on the approximately entire surfaces of the sound absorption members 3 and 23 in the present embodiment, the resin films 3c and 23c may be disposed only on parts of the surfaces opposite to the inner surface of the duct main body 2, of the sound absorption members 3 and 23. For example, the resin film 3c may be disposed only on parts opposite to pockets 2j or the ribs 2c and 2i shown in FIGS. 2(a) and 2(b), of the sound absorption member 3.

A hollow 4 is formed between the duct main body 2 and sound absorption member 3 and thus higher sound absorption effects are produced. The surface having the sound absorption member 3 disposed thereon, of the duct main body 2 includes outward protrusions 2b protruding out of the duct main body 2. The hollow 4 is formed between the outward protrusions 2b and sound absorption member 3. The outward protrusions 2b are provided with a rib 2c protruding into the duct main body 2 and extending in the length direction of the duct main body 2. Further, as shown in FIG. 2(b), the outward protrusions 2b are provided with ribs 2i protruding into the duct main body 2 and extending in the width direction of the duct main body 2. Since the sound absorption member 3 is in contact with the ribs 2c and 2i, the deformation of the sound absorption member 3 due to the internal pressure of the duct main body 2 is suppressed. Since the hollow 4 is divided by the ribs 2i, multiple hollows 4 are disposed side by side in the length direction as shown in FIG. 2(b), and the sound absorption member 3 underlies the multiple hollows 4 in the length direction.

As shown in FIG. 2(b), the edges 3b of the sound absorption member 3 in the length direction are housed in the pockets 2j disposed so as to protrude out of the duct main body 2. Surfaces b1 adjacent to the passage 2d, of the edges 3b are inclined with respect to an inner surface 2k of the duct main body 2. Thus, the disturbance of the flow of a gas in the passage 2d is suppressed, and strange noise is suppressed accordingly. The thickness of the end of each edge 3b may be any size, but it is preferably 1.0 to 5.0 mm. Similarly, surfaces 23b1 adjacent to the passage 2d, of edges 23b of the sound absorption member 23 are inclined with respect to an inner surface 2k of the duct main body 2. Thus, the disturbance of the flow of a gas in the passage 2d is suppressed. Note that the ribs 2i and pockets 2j are omitted in FIGS. 1 and 5 for the sake of convenience.

The edges 3b and 23b of the sound absorption members 3 and 23 in the length direction may be inclined by any means. Prior to introducing the sound absorption members 3 and 23 into molds 11 and 12 in steps shown in FIGS. 3(a) and 3(b), the edges 3b and 23b may be worked on by stamping or the like. An alternative is as follows: when pressing the sound absorption members 3 and 23 against molten resin sheets 14 and 13 in the step shown in FIG. 3(b), a pressure is applied to the edges 3b and 23b; and the edges 3b and 23b are compressed while melting the edges 3b and 23b using the heat of the molten resin sheets 14 and 13.

Figure 5:
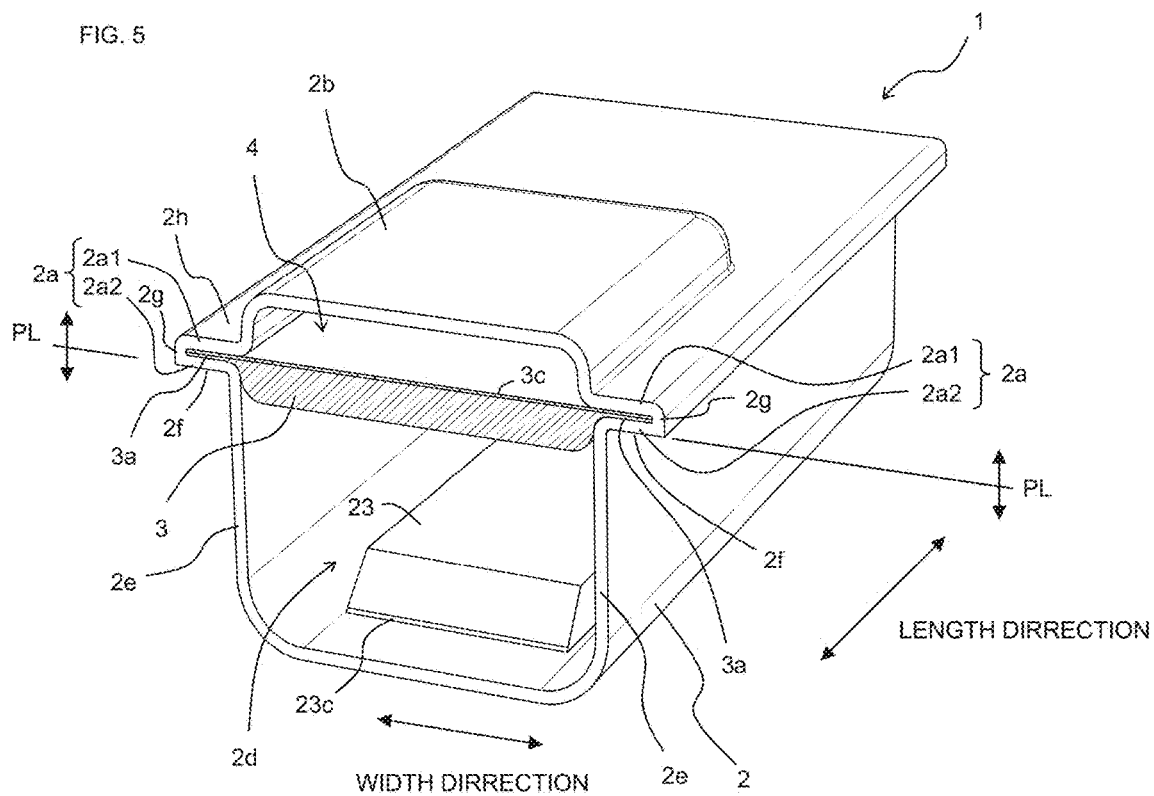
FIG. 5 is a schematic perspective view showing a modification of the sound absorption duct shown in FIG. 1.
Figure 6:
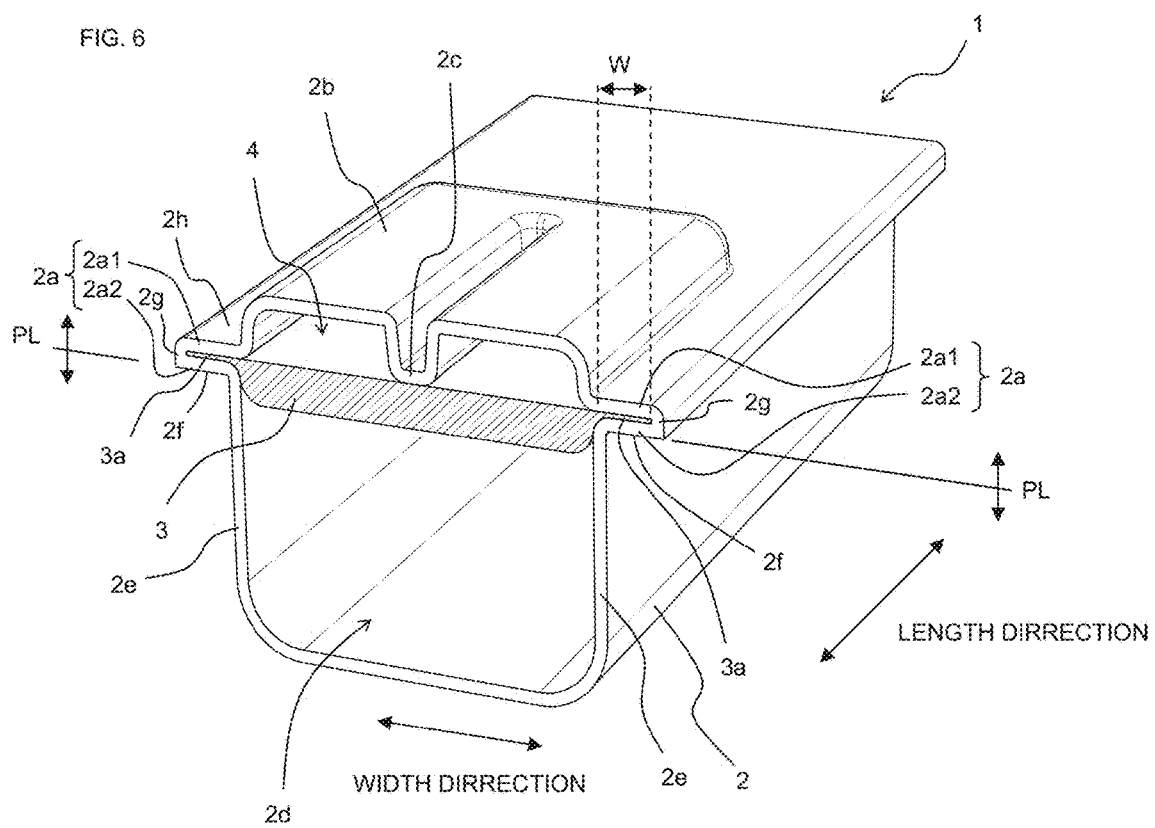
FIG. 6 is a schematic perspective view of a sound absorption duct of a second embodiment of the present invention.
Figure 8:
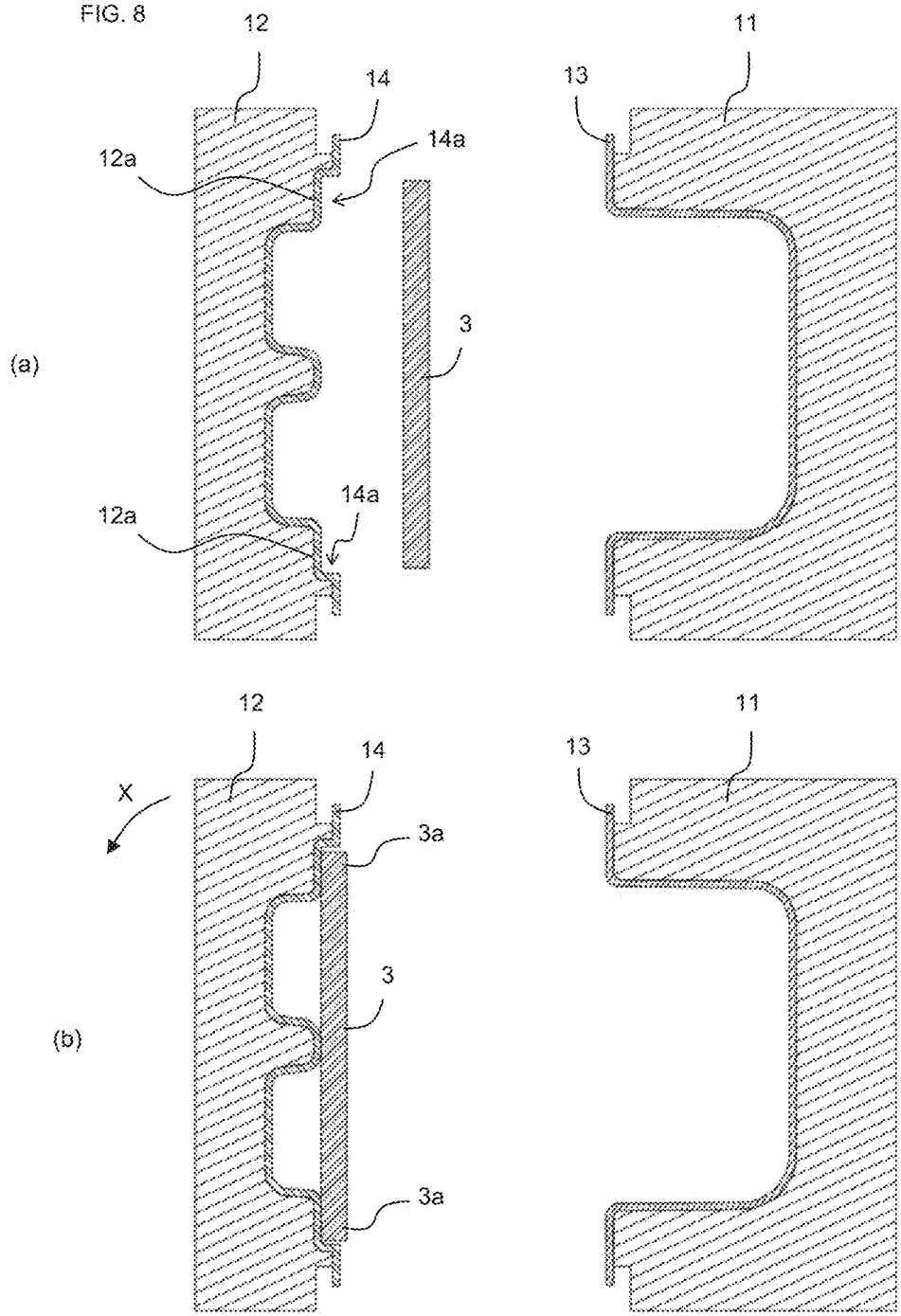
Figure 9:
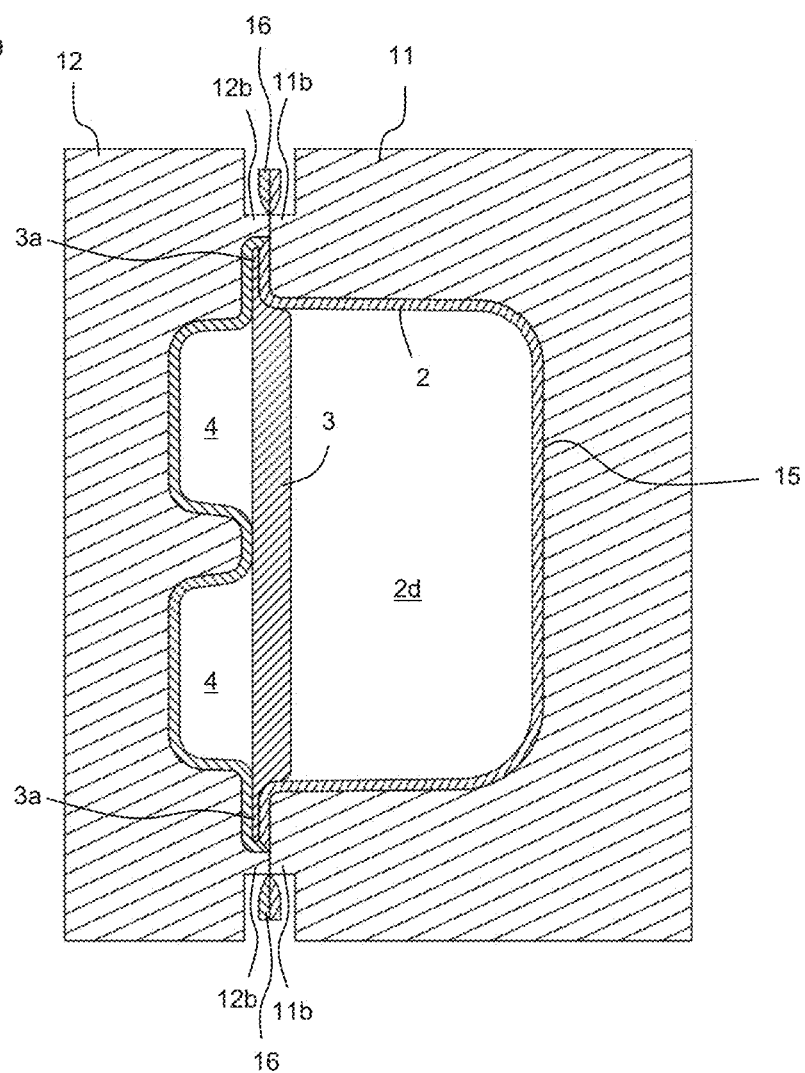
FIG. 9 is a diagram showing an example of a step of manufacturing the sound absorption duct following FIG. 8 and shows the state after the molds are closed.
Figure 10:
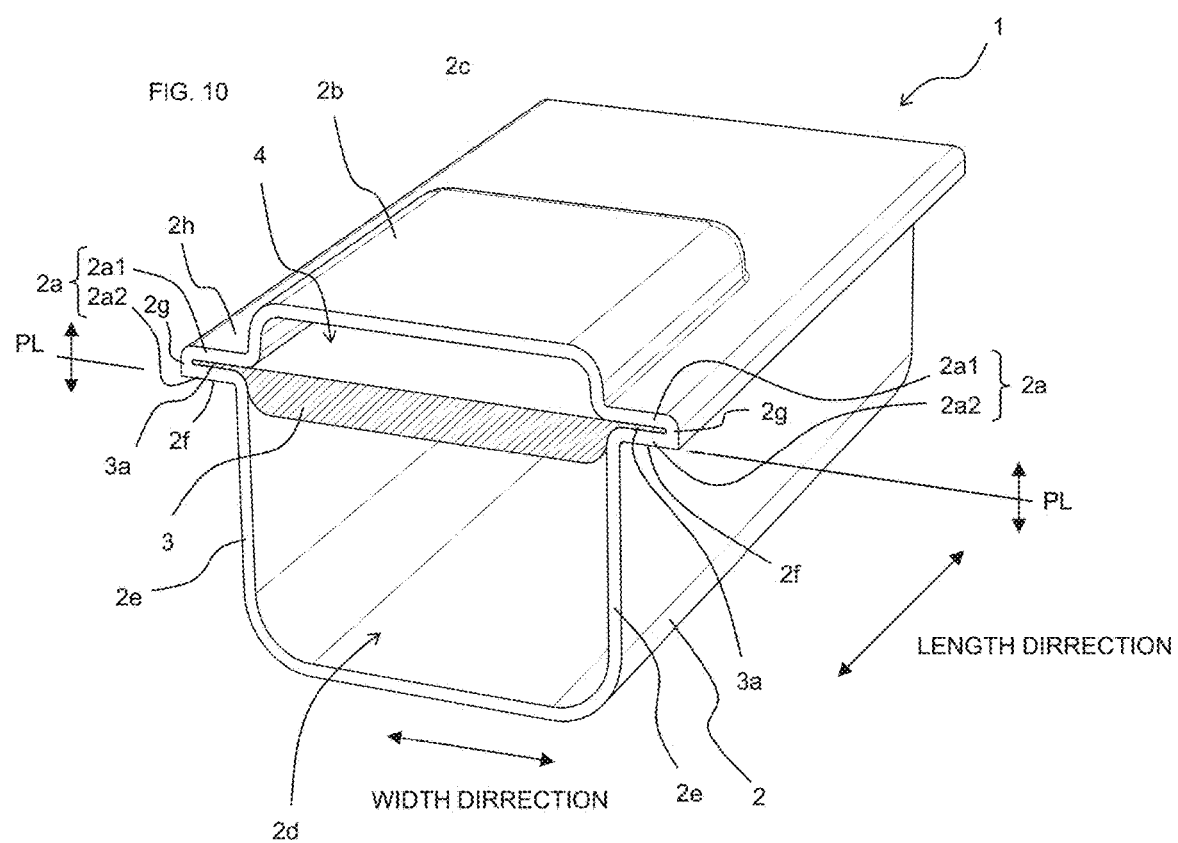
FIG. 10 is a schematic perspective view showing a modification of the sound absorption duct shown in FIG. 6.

The rib 2c need not be formed. That is, the hollow 4 need not be divided in the width direction, as shown in FIG. 5. Similarly, the ribs 2i need not be formed. That is, the hollow 4 need not be divided in the length direction. Further, the number, shape, or size of the rib 2c or ribs 2i may be other than those shown in FIG. 2. Further, the entire surface of the sound absorption member 3 may be caused to contact to the duct main body 2 without forming the hollow 4. Further, instead of forming the hollow 4 between the outward protrusions 2b and sound absorption member 3, a hollow 4 may be formed between the duct main body 2 and sound absorption member 3 by forming recesses and projections in the sound absorption member 3.

A method for manufacturing the duct 1 of the present embodiment will be described below. First, as shown in FIG. 3(a), the pair of molds 11 and 12 corresponding to the shape of the duct are prepared and then the molds 11 and 12 are caused to suck the resin sheets (parisons) 13 and 14 so that the resin sheets 13 and 14 contact tightly to the molds 11 and 12. As shown in FIG. 1, a parting line PL of the molds 11 and 12 is preferably disposed on surfaces 2f adjacent to a side wall 2e, of the sandwiching parts 2a. In this case, the molds 11 and 12 are designed such that the parting line PL comes to this position. Thus, recesses 12a having a shape corresponding to the sandwiching parts 2a are formed in the mold 12, and the recesses 12a of the mold 12 are transferred to the molten resin sheet 14, forming recesses 14a. Since the parting line PL is disposed in the above position, the relatively deep recesses 14a are easily formed in the molten resin sheet 14. Thus, the sound absorption member 3 is easily disposed in the recesses 14a in the step shown in FIG. 3(b).

As shown in FIG. 3(a), the sound absorption members 3 and 23 having the resin films 3c and 23c fixed thereto using an adhesive or the like are previously prepared.

Subsequently, as shown in FIG. 3(b), the sound absorption member 3 is pasted to the molten resin sheet 14 using a robot or the like with the resin film 3c therebetween in such a manner that the side edges 3a of the sound absorption member 3 are disposed in the recesses 14a of the molten resin sheet 14. The sound absorption member 23 is pasted to the molten resin sheet 13 with the resin film 23c therebetween.

Even when the sound absorption member 3 is formed of a material which is difficult to paste to the molten resin sheet 14, the sound absorption member 3 can be easily pasted to the molten resin sheet 14 owing to the disposition of the resin film 3c therebetween. Similarly, even when the sound absorption member 23 is formed of a material which is difficult to paste to the molten resin sheet 13, the sound absorption member 23 can be easily pasted to the molten resin sheet 13 owing to the disposition of the resin film 23c therebetween. Further, the disposition of the resin films 3c and 23c therebetween makes it difficult for heat from the molten resin sheets 13 and 14 to be transmitted to the sound absorption members 3 and 23. As a result, the degradation of the sound absorption members 3 and 23 due to heat is suppressed.

Subsequently, as shown in FIG. 4, the molds 11 and 12 are closed and thus the side edges 3a of the sound absorption member 3 are sandwiched between the resin sheets 13 and 14. The molds 11 and 12 have pinch-off parts 11b and 12b, respectively, for surrounding a cavity 15 to be formed in the molds 11 and 12. The resin sheets 13 and 14 are sandwiched between the pinch-off parts 11b and 12b and crushed. Parts outside the cavity 15, of the resin sheets 13 and 14 are fins 16. Parts sandwiched between the pinch-off parts 11b and 12b serve as lines for cutting off the fins 16.

In the present embodiment, the thickness of the sound absorption member 3 before the molds are closed is larger than the depth of the recess 14a. When the molded are closed, the side edges 3a of the sound absorption member 3 are sandwiched between the resin sheets 13 and 14 and thus compressed. Accordingly, after the molding, the compressed side edges 3a of the sound absorption member 3 are held by the sandwiching parts 2a. In this case, the side edges 3a push back the pair of wall surfaces 2a1 and 2a2 by the resilience thereof. Thus, the side edges 3a are more securely held by the sandwiching parts 2a. Note that the thickness of one or both of the side edges 3a of the sound absorption member 3 may be similar to the depth of the recesses 14a. In this case, the side edge(s) 3a of the sound absorption member 3, which has not been substantially compressed, is held by the sandwiching part(s) 2a. After the molds are closed, air may or may not be blown into the molds 11 and 12.

Subsequently, the molds 11 and 12 are opened to take out the molded products, and the fins 16 are cut off along the cut-off lines drawn on the molded products by the pinch-off parts 11b and 12b.

In this way, the duct 1 shown in FIG. 1 is formed.

Second Embodiment

A second embodiment of the present invention will be described below. The present embodiment includes the configurations (1) and (3) and configurations (A) to (C) described above. The present embodiment is similar to the first embodiment and mainly differs therefrom in that none of resin films 3c and 23c and sound absorption member 23 is provided. FIGS. 6 to 10 correspond to FIGS. 1 to 5. The following description will center on the difference.

In the present embodiment, the adhesion between a duct main body 2 and a sound absorption member 3 only has to be such that the sound absorption member 3 can be temporarily attached to a resin sheet 14 as shown in FIG. 8(b) in the molding process (to be discussed later). Accordingly, the material of the sound absorption member 3 can be freely selected regardless of the material of the duct main body 2. For example, when a duct main body 2 is formed from polypropylene, a sound absorption member 3 formed of PET can be used.

As shown in FIG. 7(b), edges 3b of the sound absorption member 3 in the length direction have a small thickness and are housed in pockets 2j disposed so as to protrude out of the duct main body 2. Thus, surfaces b1 adjacent to a passage 2d, of the edge 3bs are prevented from protruding from an inner surface 2k of the duct main body 2. As a result, the disturbance of the flow of air in the passage 2d is suppressed, and strange noise is suppressed accordingly. The thickness of the edges 3b may be any size, but it is preferably 1.0 to 5.0 mm. Note that ribs 2i and the pockets 2j are omitted in FIGS. 6 and 10 for the sake of convenience.

The thickness of the edges 3b of the sound absorption member 3 in the length direction may be reduced by any means. For example, prior to introducing the sound absorption member 3 into molds 11 and 12 in steps shown in FIGS. 3(a) and 3(b), the edges 3b may be compressed by stamping or the like. For another example, when pressing the sound absorption member 3 against a molten resin sheet 14 in the step shown in FIG. 8(b), the edges 3b may be compressed by applying a pressure to the edges 3b and melting the edges 3b using the heat of the molten resin sheet 14. For yet another example, instead of compressing the edges 3b to reduce the thickness, there may be used a sound absorption member 3 having a shape in which the thickness of the edges 3b is originally smaller than those of the other parts.

Further, as shown in FIG. 8(b), the sound absorption member 3 is pasted to the molten resin sheet 14 using a robot or the like in such a manner that the side edges 3a of the sound absorption member 3 are disposed in the recesses 14a of the molten resin sheet 14. When the sound absorption member 3 is formed of a material different from that of the molten resin sheet 14 (e.g., a material having a melting point higher than that of the molten resin sheet 14), the sound absorption member 3 is difficult to paste to the molten resin sheet 14. However, usually, the sound absorption member 3 can be pasted to the molten resin sheet 14 at least temporarily, for example, by pressing the sound absorption member 3 against the molten resin sheet 14. Even when the sound absorption member 3 cannot be pasted to the molten resin sheet 14, the side edges 3a of the sound absorption member 3 can be held in the recesses 14a, for example, by inclining the molds 11 and 12 in the direction of an arrow X in FIG. 8(b).

Third to Seventh Embodiments

Third to seventh embodiments of the present invention will be described below. These embodiments include the configurations (1) and (3) described above.

Third Embodiment

In a duct (sound absorption duct) of the present embodiment, recesses and projections are formed in a duct main body so that an air layer is formed between a sound absorption member and the duct main body. Thus, sound absorption properties are improved. In the sound absorption duct of the present embodiment, the sound absorption member and duct main body are not fused to each other in the area in which the air layer is formed.

Figure 11:
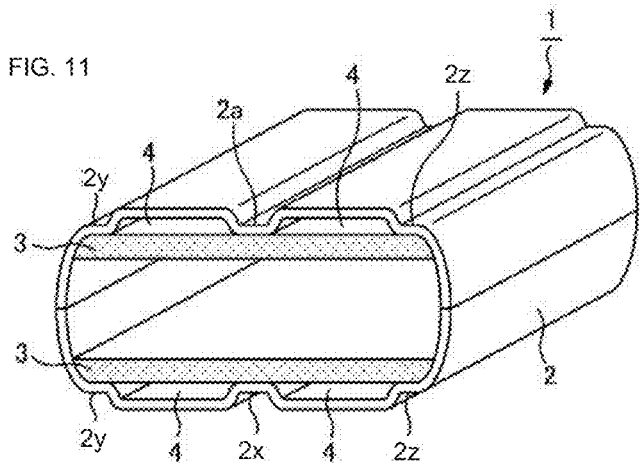
FIG. 11 is a schematic perspective view of a sound absorption duct of a third embodiment.

FIG. 11 shows a sound absorption duct 1 of the present embodiment. The sound absorption duct 1 of the present embodiment is formed by pasting sound absorption members 3 to the inner surface of a duct main body 2 formed in a rectangular tubular shape. In the sound absorption duct 1 of the present embodiment, the sound absorption members 3 are pasted to the two opposite surfaces of the rectangular duct main body 2.

The sound absorption members 3 are preferably formed of the same material as that of the duct main body 2 so that the sound absorption member 3 can be pasted to the duct main body 2. For example, when the duct main body 2 is a molded body formed of polypropylene, the sound absorption member 3 is preferably a polypropylene foam. When the duct main body 2 and sound absorption member 3 are formed of the same material, the adhesion therebetween can be increased. Further, fins or the like are easily recycled.

As described above, in the basic configuration of the sound absorption duct 1 of the present embodiment, the sound absorption members 3 are pasted to the inner surface of the duct main body 2. Further, in the sound absorption duct 1 of the present embodiment, recesses and projections are formed in the duct main body 2 so that spaces (air layers) are formed between the sound absorption members 3 and duct main body 2.

Specifically, during molding, the shapes of molds are transferred to the wall surfaces of the duct main body 2 to which the sound absorption members 3 are to paste and thus the surfaces become uneven; then, the sound absorption members 3 are pasted to the duct main body 2 so as to be supported by central projections 2x and peripheral projections 2y and 2z of the duct main body 2; and thus hollows 4 are formed between the sound absorption members 3 and duct main body 2 and serve as air layers.

Since the hollows 4 are formed as air layers between the duct main body 2 and sound absorption members 3 as described above, the sound absorption properties of the sound absorption duct 1 are drastically improved. Further, heat insulation effects and the like are significantly increased. The sound absorption properties may be further improved by pasting an additional sound absorption member to the outer surface of the duct main body 2.

Figure 12:
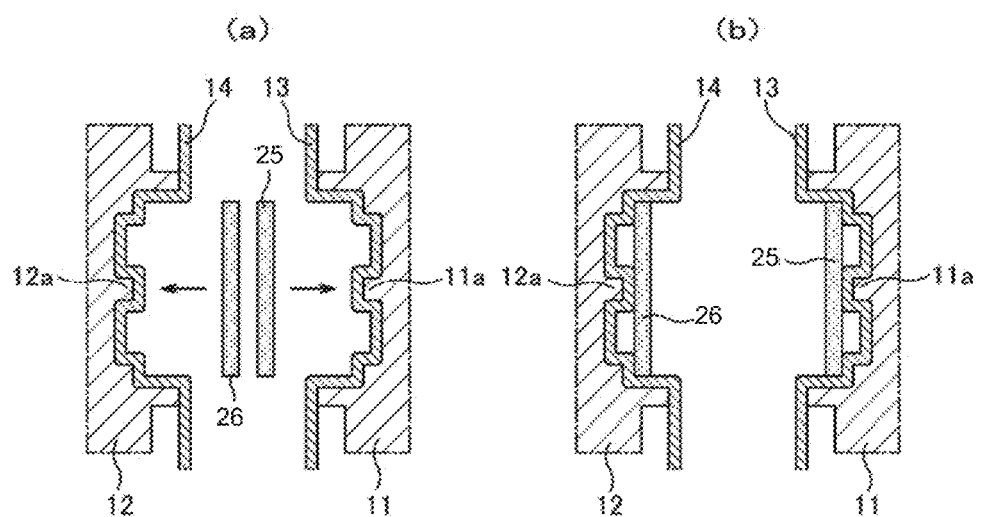

A method for manufacturing the sound absorption duct 1 of the present embodiment will be described below. As shown in FIG. 12(a), first, a pair of molds 11 and 12 corresponding to the shape of the duct are prepared and then the molds 11 and 12 are caused to suck molten resin sheets (parisons) 13 and 14 so that the molten resin sheets 13 and 14 contact tightly to the molds 11 and 12. In this case, projections 11a and 12a corresponding to recesses and projections to be formed in the duct main body are previously formed in the molds 11 and 12.

Subsequently, by causing the resin sheets 13 and 14 to contact tightly to the molds 11 and 12, the shapes of the molds 11 and 12 are transferred to the resin sheets 13 and 14. Then, sound absorption material sheets 25 and 26, which are formed of a different material, are inserted using a robot or the like and pasted to the molten resin sheets 13 and 14, as shown in FIG. 12(b). At this time, the molten resin sheets 13 and 14 exude to the sound absorption material sheets 25 and 26. Thus, the sound absorption material sheets 25 and 26 are pasted to the molten resin sheets 13 and 14 without having to use an adhesive or the like.

Lastly, the molds 11 and 12 are closed so that the molten resin sheets 13 and 14 are united and pinched off. In this way, the sound absorption duct 1 shown in FIG. 11 is formed.

Fourth Embodiment

In a sound absorption duct of the present embodiment, recesses and projections are formed in sound absorption members so that spaces are formed between a duct main body and the sound absorption members.

Figure 13:
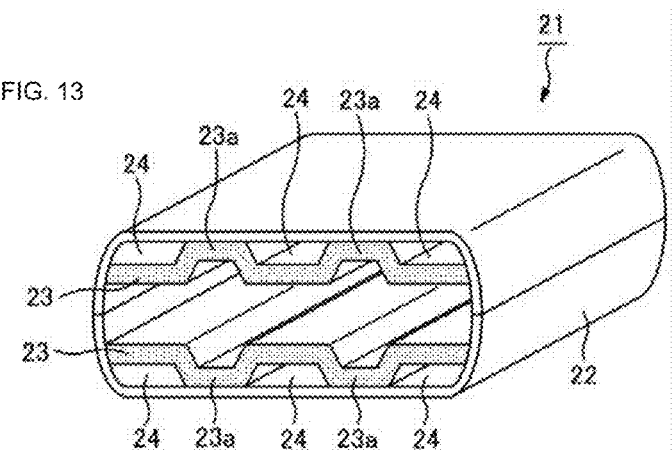
FIG. 13 is a schematic perspective view of a sound absorption duct of a fourth embodiment.

FIG. 13 shows a sound absorption duct 21 of the present embodiment. As with the sound absorption duct of the third embodiment, the sound absorption duct 21 of the present embodiment is formed by pasting sound absorption members 23 to the opposite two surfaces of a rectangular duct main body 22.

Note that no recesses or projections are formed in the duct main body 22, but rather the sound absorption members 23 are pasted to the duct main body 22 with protrusions 23a of the sound absorption members 23 butted against the duct main body 22. Thus, hollow (air layers) 24 are formed between the sound absorption members 23 and duct main body 22. As a result, as in the sound absorption duct of the third embodiment, the sound absorption properties or heat insulation properties are drastically improved.

Figure 14:
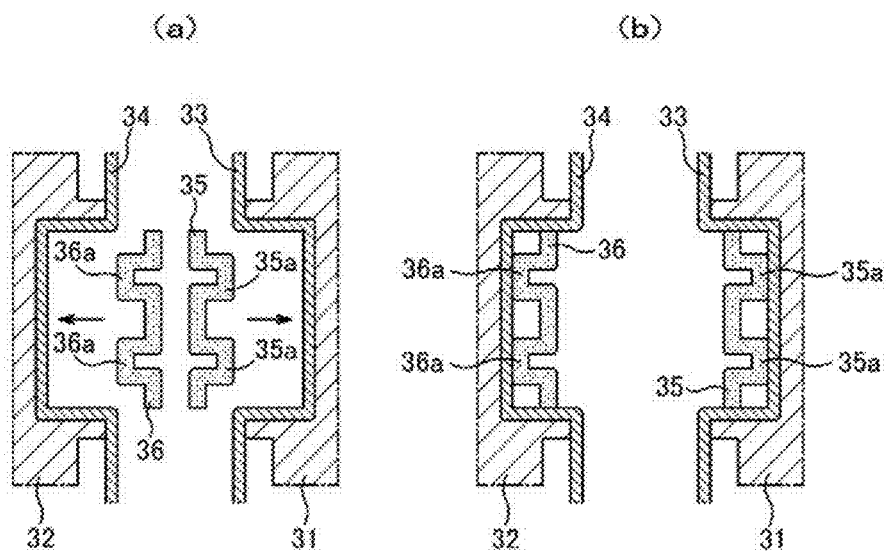

FIG. 14 shows a method for manufacturing the sound absorption duct 21 of the present embodiment. As shown in FIG. 14(a), first, a pair of molds 31 and 32 corresponding to the shape of the duct are prepared and then the molds 31 and 32 are caused to suck molten resin sheets (parisons) 33 and 34 so that the molten resin sheets 33 and 34 contact tightly to the molds 31 and 32. Note that recesses or projections need not be formed in the molds 31 and 32.

Subsequently, sound absorption material sheets 35 and 36, which are formed of a different material, are inserted using a robot or the like and then pasted to molten resin sheets 33 and 34, as shown in FIG. 14(b). At this time, the sound absorption member sheets 35 and 36 are pasted to the molten resin sheets 33 and 34 in such a manner that projections 35a and 36a previously formed in the sound absorption material sheets 35 and 36 are butted against the molten resin sheets 33 and 34.

Lastly, the molds 31 and 32 are closed so that the molten resin sheets 33 and 34 are united and pinched off. In this way, the sound absorption duct 21 shown in FIG. 13 is formed.

Fifth Embodiment

A sound absorption duct of the present embodiment is characterized in that an area of a duct main body opposite to a sound absorption member is partially cut off.

Figure 15:
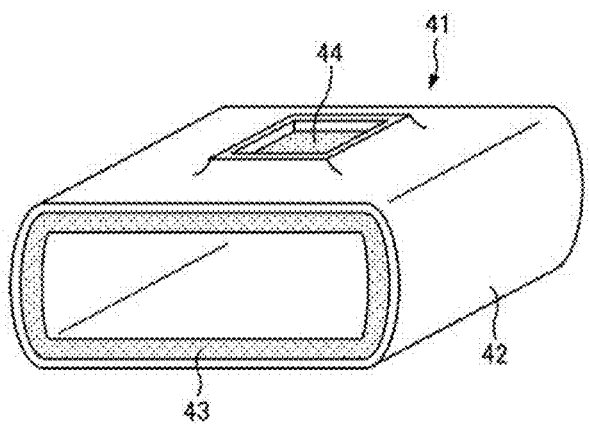
FIG. 15 is a schematic perspective view of a sound absorption duct of a fifth embodiment.

FIG. 15 shows a sound absorption duct 41 of the present embodiment. As with the sound absorption duct of the third embodiment, the sound absorption duct 41 of the present embodiment is formed by pasting a sound absorption member 43 to the opposite two surfaces of a rectangular duct main body 42.

As shown in FIG. 15, an opening 44 is formed by partially cutting off an area of the duct main body 42 opposite to the sound absorption member 43. Accordingly, the sound absorption member 43 is not in contact with the duct main body 42 in the opening 44.

In the sound absorption duct 41 of the present embodiment, air escapes through the sound absorption member 43 and the opening 44 formed in the duct main body 42. Thus, significant sound absorption effects can be produced.

Figure 16:
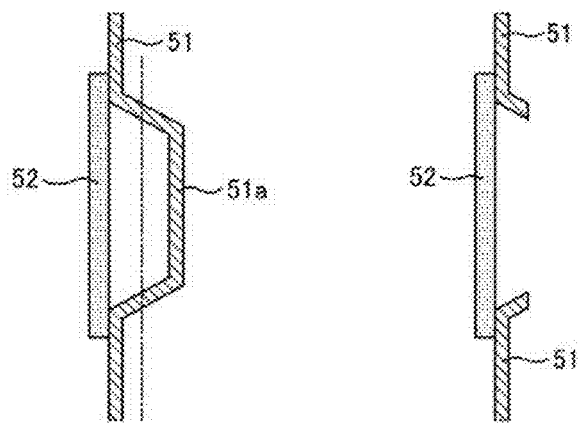

The sound absorption duct 41 of the present embodiment is manufactured as follows: as shown in FIG. 16(*a*), a recess 51*a* is formed in a molten resin sheet 51 to be formed into the duct main body 42, and the sound absorption sheet 52 is pasted to the molten resin sheet 51 so as to block the recess 51*a*; molds are closed in this state; then the sound absorption duct 41 is taken out of the molds; and, as shown in FIG. 16(*b*), the recess 51*a* of the resin sheet 51 is cut off, forming an opening.

Sixth Embodiment

Figure 17:
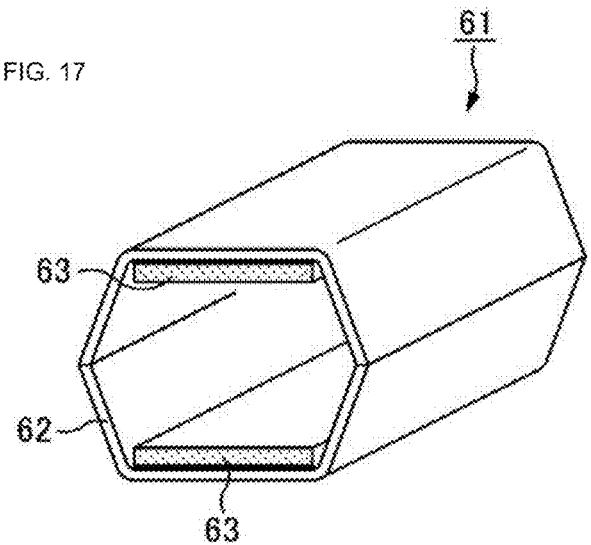
FIG. 17 is a schematic perspective view showing an example of a sound absorption duct of a sixth embodiment.

As shown in FIG. 17, a sound absorption duct 61 of the present embodiment is formed by pasting sound absorption members 63 to parts of the inner surface of a duct main body 62. The areas in which the sound absorption members 63 are not pasted are areas in which the sound absorption member 63 and duct main body 62 are not fused to each other.

Seventh Embodiment

Figure 18:
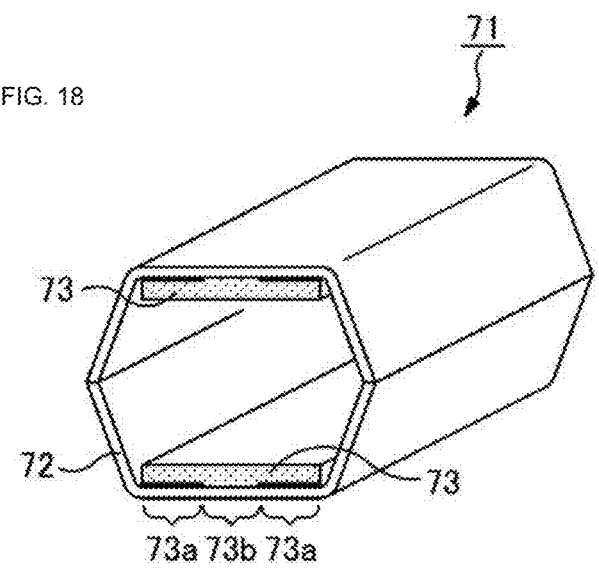
FIG. 18 is a schematic perspective view showing an example of a sound absorption duct of a seventh embodiment.

As shown in FIG. 18, a sound absorption duct 71 of the present embodiment is formed by pasting sound absorption members 73 to parts of the inner surface of a duct main body 72. Only side parts 73*a* of the sound absorption members 73 are fused to the duct main body 72, and central parts 73*b* of the sound absorption members 73 are not fused to the duct main body 72.

For example, only the side parts 73*a* of the sound absorption members 73 may be fused to the duct main body 72 as follows: when pasting the sound absorption members 73 to a resin sheet to be formed into the duct main body 72, only the side parts 73*a* are pressed, and no pressing force is applied to the other parts (the central parts 73*b* of the sound absorption members 73). For another example, sheets for blocking fusion (release sheets) or the like may be pasted to the central parts 73*b* of the sound absorption members 73.

DESCRIPTION OF REFERENCE SIGNS

1, 21, 41, 61, 71 sound absorption duct
2, 22, 42, 62, 72 duct main body
3, 23, 43, 63, 73 sound absorption member
3*c*, 23*c* resin film
4, 24 hollow (air layer)
11, 12, 31, 32 mold
13, 14, 33, 34, 51 molten resin sheet
44 opening

The invention claimed is:

1. A method for manufacturing a duct comprising a step of causing molds to suck and form a pair of molten resin sheets to be formed into a tubular duct main body, then disposing a sound absorption member on the resin sheets, and closing the molds, wherein the method has at least one of configurations (A) and (C):
   (A) the molds are configured such that a side edge of the sound absorption member is sandwiched between the pair of resin sheets, the duct main body has an outward protrusion protruding out of the duct main body, the outward protrusion is provided with a rib protruding into the duct main body, and a hollow is formed between the outward protrusion and the sound absorption member; and
   (C) a recess is formed in the resin sheet, the sound absorption member is pasted to the resin sheets over the recess, and after the duct is taken out of the molds, the recess is cut off to form an opening, exposing the sound absorption member.

2. The method of claim 1, wherein the method has the configuration (A).

3. The method of claim 2, wherein the side edge of the sound absorption member is compressed by the pair of resin sheets when the molds are closed.

4. The method of claim 1, wherein the method has the configuration (C).

* * * * *